United States Patent [19]

Murai et al.

[11] Patent Number: 4,565,859

[45] Date of Patent: Jan. 21, 1986

[54] POLYETHER COMPOUNDS, EPOXY RESINS, EPOXY RESIN COMPOSITIONS, AND PROCESSES FOR PRODUCTION THEREOF

[75] Inventors: Takaaki Murai; Shoji Watanabe; Kimio Inoue; Toyokazu Yagii, all of Hiroshima, Japan

[73] Assignee: Daicel Chemical Industries, Ltd., Osaka, Japan

[21] Appl. No.: 696,239

[22] Filed: Jan. 29, 1985

[30] Foreign Application Priority Data

Jan. 30, 1984 [JP] Japan ................................. 59-14859
Jan. 30, 1984 [JP] Japan ................................. 59-14860
Feb. 16, 1984 [JP] Japan ................................. 59-27693

[51] Int. Cl.[4] ........................................... C08G 59/42
[52] U.S. Cl. ................................... 528/365; 525/481; 528/391; 528/407; 549/551; 549/554; 549/560; 560/82; 560/193; 560/231; 564/443; 568/54; 568/631; 568/669
[58] Field of Search .......................... 568/631, 669, 54; 564/443; 549/551, 554, 560; 560/82, 193, 231; 526/309, 273; 528/365

*Primary Examiner*—Paul R. Michl
*Attorney, Agent, or Firm*—Sughrue, Mion, Zinn, Macpeak & Seas

[57] ABSTRACT

A polyether compound having ether groups and vinyl double bonds represented by formula (I)

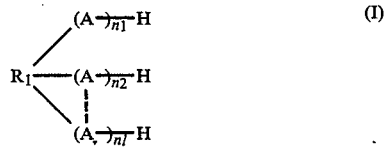

wherein $R_1$ represents a residue of an organic compound having $l$ active hydrogen atoms, $n_1$ through $n_l$ each represents 0 or an integer of from 1 to 100, the sum of the integers represented by $n_1$ through $n_l$ is from 1 to 100, and $l$ represents an integer of from 1 to 100, and A represents

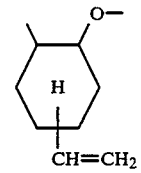

and a process for production thereof; an epoxy resin represented by formula (II)

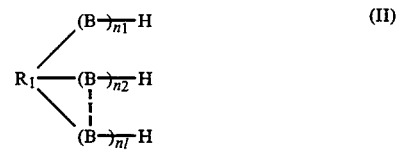

wherein $R_1$ and $n_1$ through $n_l$ are defined above, and B is an oxycyclohexane unit having a substituent and is represented by formula (III)

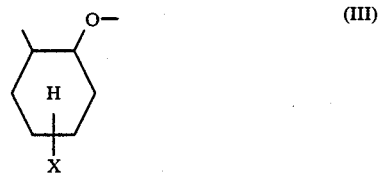

wherein X represents a

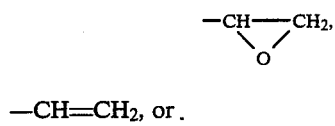

—CH=CH$_2$, or.

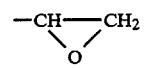

groups, wherein $R_2$ represents an alkyl group, an alkylcarbonyl group, or an arylcarbonyl group, provided that the epoxy resin represented by formula (II) contains at least one

—CH——CH$_2$
   \ /
    O group,
and a process for production thereof; and an epoxy resin comprising an epoxy resin as in formula (II), are disclosed.

15 Claims, No Drawings

POLYETHER COMPOUNDS, EPOXY RESINS, EPOXY RESIN COMPOSITIONS, AND PROCESSES FOR PRODUCTION THEREOF

FIELD OF THE INVENTION

This invention relates to novel polyether compounds having ether groups and vinyl double bonds, novel epoxy resins having excellent heat resistance, water resistance and weatherability and compositions containing the same, and to processes for production of said polyether compounds and said epoxy resins.

BACKGROUND OF THE INVENTION

Hitherto, polyether compounds such as polyethylene glycol, polypropylene glycol, polytetramethylene glycol, etc., have been widely used as raw materials of resin such as polyurethane, coatings, adhesives, molding materials, ect.

Many of these polyether compounds have a hydroxyl group at the end thereof, which causes a problem in that the scope of application is restricted in the case of using them as raw materaisl for resins. For the purpose of overcoming this problem, polyether compounds having an allyl group at the terminal portion thereof, which are prepared by polymerizing the glycidyl group of allyl glycidyl ether, and polyester compounds having a vinyl group at the end which are prepared by thermal decomposition of polypropylene glycol, etc., have been used. However, many resins obtained using these compounds are insufficient in hardness and strength, though they have excellent flexibility, because the molecular structure of these compounds is straight chain.

Epoxy resins which have been widely used include epi-bis type epoxy resins produced by reacting bisphenol A with epichlorohydrin. These resins have advantages that various products are obtained in a state of liquid to solid and they can be cured at room temperature with polyamines because reactivity of epoxy resins is high. However, cured products thereof have faults in that the weatherability is inferior, electric properties such as anti-tracking property, etc., are inferior, and the heat distortion temperature is low, although they do have desirable characteristics of good water resistance and strength. In recent years, particularly, epoxy resins prepared by reacting phenol resin with epichlorohydrin have been used as resins for encapsulating VLSI (very large scale integrated circuit), etc., but chlorine contained in the resins, typically in amounts of several hundred ppm, causes the problem of deteriorating the electric properties of electronic devices.

Epoxy resins having excellent electric properties and heat resistance which do not contain chlorine are known, such as certain alicyclic epoxy resins. These have been produced by an epoxidation reaction of a compound having a 5- or 6-membered cycloalkenyl structure. The epoxy group in these resins is the so-called inner epoxy group, and curing is usually carried out with acid anhydrides by heating. However, since reactivity is low, they cannot be cured with polyamines at room temperature. Therefore,, use of the alicyclic epoxy resins is restricted to a very narrow scope.

As alicyclic epoxy resins, those having a structure represented by (IV) or (V) have been industrially produced and used.

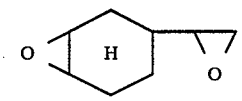

(IV)

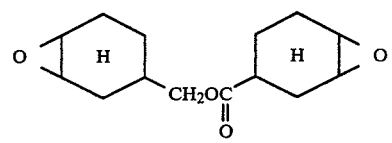

(V)

(VI) has been used as a heat resisting epoxy diluent, because of having a very low viscosity, but it has high toxicity and causes problems of poisoning by skin contact.

(V) contains only amounts of impurities and has low color hue, and cured products produced therewith have a high heat distortion temperature, but its use involves problems of inferior water resistance due to the ester bond.

In addition, because both (IV) and (V) are liquid epoxy resins having a low viscosity, it is impossible to apply molding systems for solid epoxy resins, such as transfer molding, etc., to them.

SUMMARY OF THE INVENTION

As a result of extensive studies in order to develop novel polyether compounds and epoxy resins which overcome the above-described problems, there have now been found novel polyether compounds having vinyl double bonds in the molecule and a structure capable of giving hardness as raw materials for resin and epoxy resins having excellent water resistance and heat resistance and having excellent reactivity which are alicyclic type and can be obtained in a suitable state of liquid to solid, and compositions including said epoxy resins, whereby the present invention has now been accomplished.

Namely, the present invention relates to a polyether compound having ether groups and vinyl double bonds represented by formula (I)

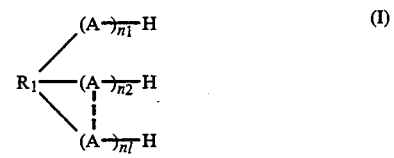

(I)

wherein $R_1$ represents a residue of an organic compound having l active hydrogen atoms, $n_1$ through $n_l$ each represents 0 or an integer of from 1 to 100, the sum of the integers represented by $n_1$ through $n_l$ is from 1 to 100, and l represents an integer of from 1 to 100, and A represents

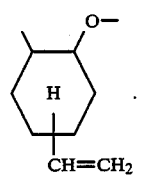

In another aspect, the present invention relates to a process for producing the polyether compound of formula (I) by reacting a compound having active hydrogen atoms with 4-vinylcyclohexene-1-oxide in the presence of a catalyst.

In a further aspect, the present invention relates to an epoxy resin represented by formula (II)

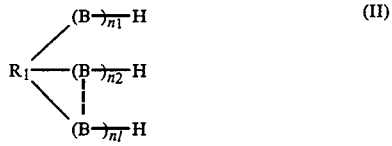

wherein $R_1$ represents a residue of an organic compound having $l$ active hydrogen atoms, $n_1$ through $n_l$ each represents 0 or an integer of from 1 to 100, the sum of the integers represented by $n_1$ through $n_l$ is from 1 to 100, and $l$ represents an integer of from 1 to 100, and B is an oxycyclohexane unit having a substituent and is represented by formula (III)

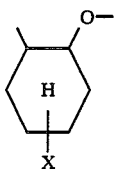

wherein X represents a

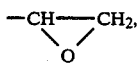

—CH=CH$_2$, or

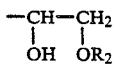

groups, wherein $R_2$ represents an alkyl group, an alkylcarbonyl group, or an arylcarbonyl group, provided that the epoxy resin represented by formula (II) contains at least one

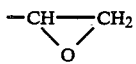

group.

In a still further aspect, the present invention relates to a process for producing the epoxy resin of formula (II) by reacting the polyether compound of formula (I) with an epoxidating agent.

In an even further aspect, the present invention relates to an epoxy resin composition comprising the epoxy resin of formula (II), which has excellent water resistance and heat resistance and which can be obtained in a suitable state of liquid to solid.

DETAILED DESCRIPTION OF THE INVENTION

In the polyether compound of formula (I) and the epoxy resin of formula (II) of the present invention, $R_1$ is a residue of an organic compound having active hydrogen atoms. Any residue can be used, if it is a residue of a compound having active hydrogens. Two or more of them may be mixed. Examples of organic compounds having active hydrogen atoms which are precursors of such residues include alcohols, phenols, carboxylic acids, amines, and thiols, with alcohols being preferred.

As alcohols, for instance, either monohydric alcohols or polyhydric alcohols may be used. Examples include aliphatic alcohols having from 1 to 10 carbon atoms, which may have unsaturated groups, such as methanol, ethanol, propanol, butanol, pentanol, hexanol, octanol, allyl alcohol, etc., aromatic alcohols such as benzyl alcohol, and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, neopentyl glycol oxypivalate, cyclohexane-dimethanol, glycerine, diglycerine, polyglycerine, trimethylolpropane, trimethylolethane, pentaerythritol, dipentaerythritol, etc.

Phenols include phenol, cresol, catechol, pyrogallol, hydroquinone, hydroquinone monomethyl ether, bisphenol A, bisphenol F, 4,4'-dihydroxybenzophenone, bisphenol S, phenol novolak resins, cresol novalak resins, etc.

Carboxylic acids include formic acid, acetic acid, propionic acid, butyric acid, fatty acids of animal and vegetable oils and fats, fumaric acid, maleic acid, adipic acid, dodecanedioic acid, trimellitic acid, pyromellitic acid, polyacrylic acid, phthalic acid, isophthalic acid, terephthalic acid, etc. In addition, compounds having a hydroxyl group together with a carboxylic acid group, such as lactic acid, citric acid, oxycaproic acid, etc., are appropriate precursors for $R_1$ residues.

Amines include methylamine, ethylamine, propylamine, butylamine, pentylamine, hexylamine, cyclohexylamine, octylamine, dodecylamine, 4,4'-diaminodiphenylmethane, isophoronediamine, toluenediamine, hexamethylenediamine, xylenediamine, diethylenetriamine, triethylenetetramine, ethanolamine, etc.

Thiols include mercaptans such as methyl mercaptan, ethyl mercaptan, propyl mercaptan, phenyl mercaptan, etc., mercaptopropionic acid and polyhydric alcohol esters of mercaptopropionic acid, such as ethylene glycol bismercaptopropionate, trimethylolpropane trismercaptopropionate, pentaerythritol tetrakismercaptopropionate, etc.

Other compounds having active hydrogen atoms include polyvinyl alcohol, partially hydrolyzed products of polyvinyl acetate, starch, cellulose, cellulose acetate, cellulose acetate butyrate, hydroxyethyl cellulose, acrylic polyol resins, styrene-allyl alcohol copolymer resins, styrene-maleic acid copolymer resins, alkyd resins, polyester polyol resins, polyester carboxylic acid resins, polycaprolactone polyol resins, polypropylene polyol, polytetramethylene glycol, etc.

The compounds having active hydrogen atoms may have an unsaturated double bond in their structure, examples of which include allyl alcohol, acrylic acid, methacrylic acid, 3-cyclohexenyl methanol, tetrahydrophthalic acid, etc. The unsaturated double bond in these compounds may have a structure that is epoxidated.

$n_1$ through $n_l$ in formulae (I) and (II) are each 0 or an integer of from 1 to 100, and the sum of the integers representing $n_1$ through $n_l$ is from 1 to 100. If it is more than 100, solids or resins having a high softening point are obtained, which are difficult to handle and use from a practical viewpoint.

l represents an integer of from 1 to 100.

The epoxy resin of formula (II) contains at least one

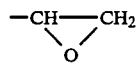

group, but it is more desirable that the number of

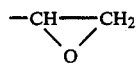

groups is greater and, conversely, the number of

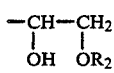

groups is smaller. I.e., the greater part of the substituent X in formula (III) comprises

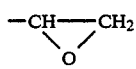

groups.

The polyether compounds of formula (I) of the present invention can be obtained by reacting a compound having active hydrogen atoms with 4-vinylcyclohexene-1-oxide in the presence of a catalyst. By varying a reaction ratio of 4-vinylcyclohexene-1-oxide represented by the following formula

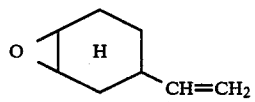

to active hydrogen atoms, vinyl compounds (I) containing ether groups wherein $n_1$ through $n_l$ is up to 100 can be obtained.

In practice, the resulting compound is a mixture of compounds represented by formula (I).

Catalysts used for the reaction include amines such as methylamine, ethylamine, propylamine, piperazine, etc., organic bases such as pyridines, imidazoles, etc., quaternary ammonium salts such as tetramethylammonium chloride, tetrabutylammonium bromide, etc., organic acids such as formic acid, acetic acid, propionic acid, etc., inorganic acids such as sulfuric acid, hydrochloric acid, etc., phosphines such as triphenylphosphine, etc., alcoholates such as sodium methylate, etc., alkalis such as KOH, NaOH, etc., Lewis acids such as $BF_3$, $ZnCl_2$, $AlCl_3$, $SnCl_4$, etc., and organometallic compounds such as triethyl aluminum, diethyl zinc, etc. These catalysts are used in a concentration of 0.01% to 10%, and, preferably, 0.1% to 5%. In case of less than 0.01%, the reaction does not proceed at all or the reaction rate is very low if the reaction proceeds. In case of more than 10%, the catalyst is believed to be useless in practice.

The reaction can be carried out in the presence of the catalyst at a suitable temperature, generally from $-70°$ C. to 200° C., and preferably from $-30°$ C. to 100° C.

The reaction can be carried out in the absence of a solvent or can be carried out in the presence of a suitable organic solvent, for example, esters such as ethyl acetate, ethyl propionate, etc., ketones such as acetone, methyl ethyl ketone, etc., aromatic hydrocarbons such as benzene, toluene, etc., chlorinated hydrocarbons such as chloroform, carbon tetrachloride, etc., dimethylformamide or dimethyl sulfoxide, etc.

The polyether compounds obtained by the present invention are useful as raw materials for preparing epoxy resin compounds according to the invention and resins having excellent hardness, strength, and weatherability can be obtained, because the basic skeleton is composed of cyclohexane rings. Further, they are excellent in weatherability.

The polyether compounds can further be utilized for other reactions, because the double bond is a so-called end-double bond. For example, they can be used as raw materials for silane coupling agents by adding silane compounds, or they can be utilized as modifying agents for unsaturated polyester resin, etc., by utilizing the radical polymerizability of the vinyl groups.

4-Vinylcyclohexene-1-oxide used in the above reaction can be obtained by partially epoxidating 4-vinylcyclohexene obtained by a dimerization reaction of butadiene, with peracetic acid.

Epoxy resins represented by formula (II) can be produced by epoxidating the polyether compound of formula (I) with an epoxidating agent such as peracids or hydroperoxides.

As peracids, performic acid, peracetic acid, perbenzoic acid, trifluoroperacetic acid, etc., can be used.

Of these, peracetic acid is a preferable epoxidating agent, because it is available industrially at a moderate price and has high stability.

As hydroperoxides, hydrogen peroxide, tertiary butyl hydroperoxide, cumene peroxide, etc., can be used.

In carrying out epoxidation, catalysts can be used as is appropriate under the circumstances. In the case of peracids, for example, alkalis such as sodium carbonate, etc., or acids such as sulfuric acid, etc., can be used as catalysts. In the case of hydroperoxides, it is possible to obtain a catalytic effect, for example, by using a mixture of tungstic acid and sodium hydroxide together with hydrogen peroxide, or organic acid together with hydrogen peroxide, or hexacarbonylmolybdenum together with tertiary butyl hydroperoxide.

The epoxidation reaction is carried out in the absence or presence of a solvent or by controlling the reaction temperature according to the apparatus or properties of raw material.

The substituent

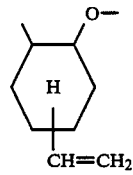

in the polyether compound of formula (I) and the substituent

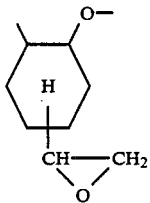

in the epoxy resin of formula (II) formed cause side reactions with the epoxidating agent and others simultaneously with epoxidation of olefin bonds under conditions for epoxidation reaction, and, consequently, modified substituents are formed and introduced into the desired compound. The relative amounts of the substituent

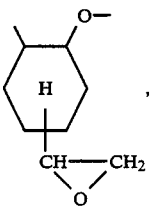

the substituent

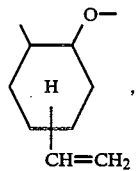

and the modified substituents depend upon kind of the epoxidating agent, molar ratio of the epoxidating agent to olefin bonds, and the reaction conditions.

For example, in the case that the epoxidating agent is peracetic acid, the modified substituents mainly have the following structure, which is formed from the formed epoxy group and by-produced acetic acid.

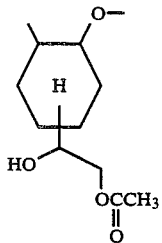

The desired compound can be from the crude reaction solution by conventional chemical engineering means, such as a method in which a solvent is added, the acetic acid is removed by the addition of water, and then, distillation is performed by means of, for example, a thin film evaporator, or a method in which the crude reaction mixture is directly introduced into a thin film evaporator to thereby distil off low-boiling matters.

The epoxy resin of formula (II) obtained as described above can be cross-linked with phenol novolak resins or other curing agents (hardeners) to form compositions useful as excellent encapsulating materials for VLSI because of having a very low content of chlorine impurities.

Further, they have an advantage in that the performance thereof can be adapted for the prior uses of epoxides, such as immersion coils, etc., as substitutes therefor, by controlling the degree of polymerization, etc., at will. In addition, they can be applied to various uses, such as encapsulating agents for LED (light emitting diode) or semiconductors, coatings, etc.

The epoxy resins in the present invention can be used as a mixture with other epoxy resins provided that characteristics of the composition are not damaged. As other epoxy resins, any resins can be used if they are conventionally used. Examples of them include epoxy diluents such as epi-bis type epoxy resins, bisphenol F epoxy resins, novolak epoxy resins, alicyclic epoxy resins, styrene oxide, butylglycidyl ether, etc.

As curing agents (hardeners) used in the present invention, those used for known epoxy resins can be used. Examples thereof include amines, polyamide resins, acid anhydrides, polymercaptan resins, novolak resins, dicyandiamide, boron trifluoride-amine complexes, etc.

Various types of amines can be used.

Examples of aliphatic polyamines include diethylenetriamine, triethylenetetramine, menthenediamine, m-xylylenediamine, bis(4-amino-3-methylcyclohexyl)methane, etc., adducts of the above-described aliphatic polyamines and known epoxy compounds, reaction products of said amine and acrylonitrile and reaction products of said amine and ketone.

Examples of aromatic polyamines include m-phenylenediamine, diaminodiphenylmethane, diaminodiphenyl sulfone, diaminodiphenyl sulfide, etc., and adducts of the above-described aromatic polyamines and known epoxy compounds.

Examples of secondary and tertiary amines include tris(dimethylaminomethyl)phenol, piperidine, imidazole derivatives thereof, etc., mixtures of the above-described amines, and salts thereof.

Examples of polyamide resins include reaction products of aliphatic acid, such as fatty acids, dimer acids, trimer acids, etc., and polyamines.

Examples of acid anhydrides include phthalic anhydride, trimellitic anhydride, pyromellitic anhydride, benzophenonetetracarboxylic acid dianhydride, tetrahydrophthalic anhydride, hexahydrophthalic anhydride, methyltetrahydrophthalic anhydride, methylnudic anhydride, dodecylsuccinic anhydride, succinic anhydride, etc., and mixtures of the above-described acid anhydrides.

Examples of novolak resins include resinous products having a low molecular weight prepared by condensation of phenol or a mixture of phenol and cresol or dihydroxybenzene and formaldehyde.

Examples of boron trifluoride-amine complexes include complexes of amine compounds having a low molecular weight such as monoethylamine, piperidine, aniline, butylamine, dibutylamine, cyclohexylamine, dicyclohexylamine, tributylamine, triethanolamine, etc., and boron trifluoride.

Examples of other curing agents that can be used include salts such as diazonium salts, iodonium salts, bromonium salts, sulfinium salts, etc., of superstrong acids such as boron trifluoride, phosphorus hexafluoride, arsenic hexafluoride, etc. Of these curing agents, aliphatic polyamines, aromatic polyamines, polyamide resins and polymercaptan resins can be used by mixing them in an arbitrary rate, which may be used alone or together with accelerators for the purpose of controlling curing rate. As such curing accelerators, the above-described secondary and tertiary amines can be used.

The acid anhydrides can be used alone, but they may be used together with curing catalysts or curing accelerators for the purpose of improving properties of the cured products. Examples of the curing catalysts include the above-described secondary and tertiary amines and tin octylate. Examples of the curing accelerators include water, alcohols such as ethanol, propanol, isopropanol, cyclohexanol, ethylene glycol, etc., carboxylic acids such as acetic acid, propionic acid, succinic acid, hexahydrophthalic acid, etc., and active hydrogen-containing amines, such as ethylenediamine, diethylenetriamine, etc.

The novolak resins can be used alone or together with curing catalysts for the purpose of controlling curing rate. Examples of such curing catalysts include the above-described secondary and tertiary amines.

The dicyandiamide can be used alone or together with curing catalysts for the purpose of controlling curing rate. Examples of such curing catalysts include the above-described secondary and tertiary amines.

The boron trifluoride-amine complexes can be used alone or together with curing rate controllers for the purpose of controlling the curing rate. As such curing rate controllers, any substance can be used if it can be used for the prior epoxy resins. Examples thereof include carboxylic acids, amines, acetylacetone complexes of metal, organometal compounds of metals such as titanium, tin, etc., glycols, organoboron compounds, etc.

Fillers that can be used in the compositions of the present invention include any material that is conventionally used as a filler for resins. Examples thereof include siliceous sand, silica, alumina, diatomaceous earth, calcium carbonate, asbestos, glass, magnesium carbonate, kaolin, metal powders, etc. With respect to shape, various kinds of shape, such as fibers, flakes, etc., can be used.

Flame retarders that can be used in the compositions include any substance that is conventionally used as a flame retarder for resins. Examples thereof include tetrabromobisphenol A, halides such as hexabromobenzene, etc., phosphorus compounds such as tris(dibromopropyl)phosphate, trischloroethyl phosphate, etc., antimony trioxide, etc.

In addition, other kinds of additives can be used according to the particular purpose. For example, there are agents for giving thixotropy, such as Aerosil, Orben, etc., agents for giving electric conductivity such as carbon black, etc., parting agents, lubricants, dyes, pigments, coupling agents, agents for giving flexibility, plasticizers, etc., which can be used by diluting with a solvent.

The resin compositions obtained as described above can be molded and cured to produce cured products which are excellent in mechanical properties such as tensile strength, hardness, etc., electric properties such as anti-tracking property, anti-arc property, etc., and heat distortion temperature, and show low corrosion, and they can be used as encapsulating agents for semiconductors, insulating varnishes, fiber reinforced plastics, casting products, moldings, etc.

In the following, the present invention will be illustrated in greater detail with reference to examples.

EXAMPLE 1

32 g (1 mol) of methanol and 869.3 g (7 mols) of 4-vinylcyclohexene-1-oxide were put in a 1 liter separable flask, and 4.5 g of $BF_3 \cdot O(CH_2CH_3)_2$ was added as a catalyst to carry out reaction with keeping the reaction temperature at 60° C. When analysis was carried out by gas chromatography after the reaction was carried out for about 12 hours, the methanol inversion rate was 99.8% and the vinylcyclohexene monoepoxide inversion rate was 98.8%. When the structure of the product was analyzed by elemental analysis, NMR and IR, it was confirmed to have a structure represented by formula (I-1).

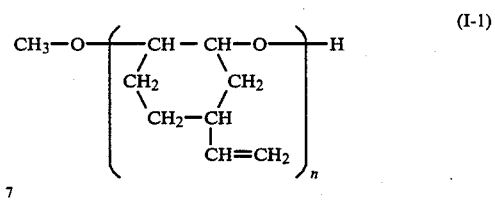

n: average 7

When an infrared absorption spectrum of the resulted product was compared with that of 4-vinylcyclohexene-1-oxide of the raw material, absorption of epoxy group in 810, 850 and 1,850 cm$^{-1}$ disappeared and absorption of ether bond was formed in 1,080 cm$^{-1}$ and 1,150 cm$^{-1}$. Further, absorption of vinyl group was observed in 910 cm$^{-1}$ and 1,640 cm$^{-1}$.

According to analysis by NMR, peaks corresponding to 21 protons based on the vinyl group were observed in values 5.1 ppm and 5.9 ppm, and a peak corresponding to 3 protons based on the methyl group was observed in 3.4 ppm.

Values of elemental analysis are shown in the following.

|  | C (%) | H (%) |
| --- | --- | --- |
| Found value | 76.18 | 9.72 |
| Theoretical value | 75.96 | 9.84 |

From the above-described results, the structure represented by (I-1) was confirmed.

EXAMPLE 2

58 g (1 mol) of allyl alcohol and 372.5 g (3 mols) of 4-vinylcyclohexene-1-oxide were allowed to react by the same manner as in Example 1 to obtain a product.

The resulted product was analyzed by elemental analysis, IR and NMR.

A compound having a structure represented by the formula (I-2) was obtained.

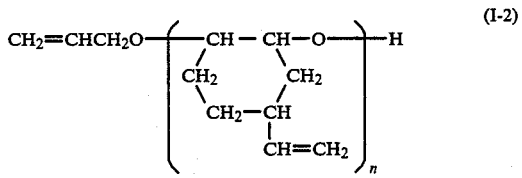

n: average 3

According to IR analysis, absorption of epoxy group in 810, 850 and 1,850 cm$^{-1}$ disappeared similarly to Example 1, and absorption of ether bond was newly formed in 1,080 cm$^{-1}$. Further, absorption of vinyl group in 910 cm$^{-1}$ and 1,640 cm$^{-1}$ remained.

According to NMR, peaks similar to Example 1 were confirmed, and peaks corresponding to 12 protons based on the allyl group and the vinyl group were observed in values of 5.1 ppm and 5.9 ppm.

Values of elemental analysis are as follows.

|  | C (%) | H (%) |
|---|---|---|
| Found value | 75.72 | 9.76 |
| Theoretical value | 75.31 | 9.83 |

From the above-described results, the structure represented by (I-2) was confirmed.

EXAMPLE 3

134 g (1 mol) of trimethylolpropane and 1,863 g (15 mols) of 4-vinylcyclohexene-1-oxide were allowed to react by the same manner as in Example 1 to obtain a product.

The resulting product was identified by elemental analysis, IR analysis and NMR analysis and confirmed to have a structure represented by the formula (I-3):

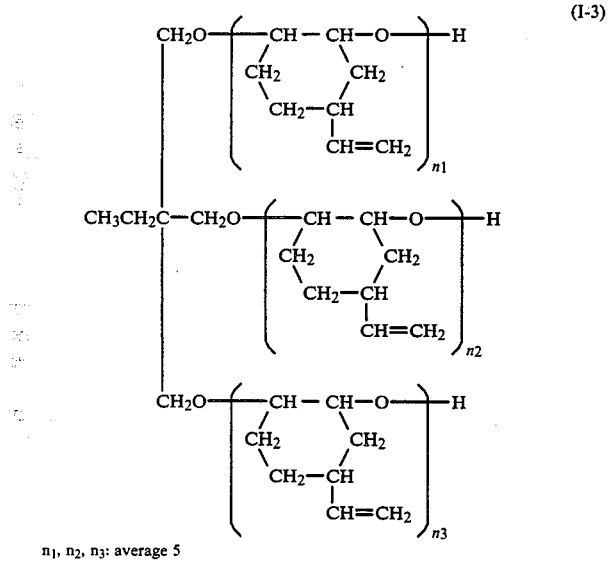

n$_1$, n$_2$, n$_3$: average 5

According to IR analysis, absorption of epoxy group in 810, 850 and 1,850 cm$^{-1}$ disappeared similarly to Example 1, and absorption of ether bond was newly formed in 1,080 cm$^{-1}$. Further, absorption of vinyl group in 910 cm$^{-1}$ and 1,640 cm$^{-1}$ remained.

According to NMR, peaks similar to Example 1 were confirmed.

Values of elemental analysis are as follows.

|  | C (%) | H (%) |
|---|---|---|
| Found value | 76.05 | 9.65 |
| Theoretical value | 75.82 | 9.73 |

From the above described results, the structure represented by (I-3) was confirmed.

EXAMPLE 4

116 g (2 mols) of allyl alcohol, 496 g (4 mols) of 4-vinylcyclohexene-1-oxide and 3.1 g of BF$_3$·etherate were mixed at 60° C., and they were allowed to react till the 4-vinylcyclohexene-1-oxide inversion rate measured by gas chromatography became 98% or more. The resulted crude reaction solution was washed with water by adding ethyl acetate, and the ethyl acetate layer was then concentrated to obtain a viscous liquid.

The resulting compound was confirmed that it has a structure represented by the following formula (I-4) from the facts that absorption of epoxy group in 810 and 850 cm$^{-1}$ being observed in the raw material disappeared in the infrared ray absorption spectrum of the product, that absorption by the ether bond was present in 1,080 and 1,150 cm$^{-1}$ and that the product contained a trace amount of allyl alcohol in gas chromatography, but absorption of OH group was present in 3,450 cm$^{-1}$ in the infrared ray absorption spectrum.

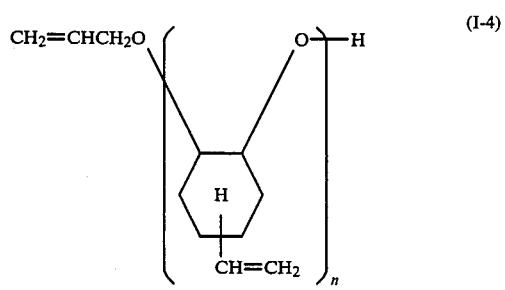

n: average 2

434 g of this compound was dissolved in ethyl acetate and put in a reactor. To the solution, a solution containing 388 g of peracetic acid in ethyl alcohol was added dropwise over 2 hours. During addition, the reaction temperature was kept at 40° C. After conclusion of addition of peracetic acid, the mixture was kept at 40° C. for 6 hours.

To the crude reaction solution, ethyl acetate was additionally added, and the solution was washed with an aqueous alkali solution containing 416 g of sodium carbonate and subsequently washed well with distilled water.

The ethyl acetate layer was concentrated to obtain a viscous transparent liquid. In this compound, the oxirane oxygen content was 9.97% and a characteristic absorption by the epoxy group was observed in 1,260 cm$^{-1}$ in the infrared ray absorption spectrum. Further, absorption by residual vinyl group was observed in 1,640 cm$^{-1}$ and absorption of OH group was observed in 3,450 cm$^{-1}$ and that of

was observed in 1,730 cm$^{-1}$. From these facts, this compound was confirmed to have a structure represented by the formula (II) (wherein R$_1$: glycidyl ether group or allyloxy group, n: average 2, which slightly contained the group wherein acetic acid added to the epoxy group).

EXAMPLE 5

58 g (1 mol) of allyl alcohol, 868 g (7 mols) of 4-vinyl-cyclohexene-1-oxide and 4.7 g of BF$_3$·etherate were allowed to react in the same manner as in Example 4 to obtain a viscous liquid product.

The resulting compound was confirmed that it has a structure represented by the following formula (I-5) from the facts that absorption of epoxy group in 810 and 850 cm$^{-1}$ being observed in the raw material disappeared in the infrared ray absorption spectrum of the product, that absorption by the ether bond was present in 1,080 and 1,150 cm$^{-1}$ and that the product contained a trace amount of allyl alcohol in gas chromatography, but absorption of OH group was present in 3,450 cm$^{-1}$ in the infrared ray absorption spectrum.

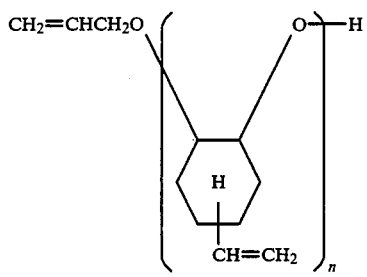

n: average 7

492 g of this compound and 395 g of peracetic acid were allowed to react by the same manner as in Example 4 to obtain a viscous transparent liquid.

In the resulting compound, the oxirane oxygen content was 9.27%, and characteristic absorption by the epoxy group was observed in 1,260 cm$^{-1}$ in the infrared ray absorption spectrum. Further, absorption by the residual vinyl group was observed in 1,640 cm$^{-1}$ and absorption of OH group was observed in 3,450 cm$^{-1}$ and that of

was observed in 1,730 cm$^{-1}$. From these facts, this compound was confirmed to have a structure represented by formula (II) (wherein $R_1$: glycidyl ether group or allyloxy group, n: average 7, which slightly contained the group wherein acetic acid added to the epoxy group).

EXAMPLE 6

64 g (2 mols) of methanol, 744 g (6 mols) of 4-vinylcyclohexene-1-oxide and 4.1 g of BF$_3$·etherate were allowed to react by the same procedure as in Example 4 to obtain a viscous liquid product.

The resulting compound was confirmed that it has a structure represented by the following formula (I-6) from the facts that absorption of epoxy group in 810 and 850 cm$^{-1}$ being observed in the raw material disappeared in the infrared ray absorption spectrum of the product, that absorption by the ether bond was present in 1,080 and 1,150 cm$^{-1}$ and that the product contained a trace amount of methanol in gas chromatography, but absorption of OH group was present in 3,450 cm$^{-1}$ in the infrared ray absorption spectrum.

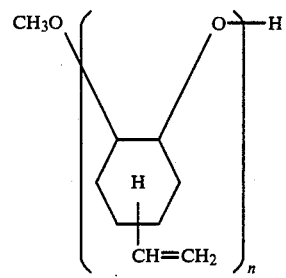

n: average 3

573 g of this compound and 387 g of peracetic acid were allowed to react in the same manner as in Example 4 to obtain a viscous transparent liquid.

In the resulting compound, the oxirane oxygen content was 9.03%, and characteristic absorption by the epoxy group was observed in 1,260 cm$^{-1}$ in the infrared ray absorption spectrum. Further, absorption by the residual vinyl group was observed in 1,640 cm$^{-1}$, and absorption of OH group was observed in 3,450 cm$^{-1}$ and that of

was observed in 1,730 cm$^{-1}$. From these facts, this compound was confirmed that it has a structure represented by formula (II) (wherein $R_1$: methoxy group, n: average 3, which slightly contained the group wherein acetic acid added to the epoxy group).

EXAMPLE 7

573 g of the compound obtained in Example 3 and 387 g of peracetic acid were allowed to react in the same manner as in Example 4 to obtain a viscous transparent liquid.

In the resulting compound, the oxirane oxygen content was 9.03%, and characteristic absorption by the epoxy group was observed in 1,260 cm$^{-1}$ in the infrared ray absorption spectrum. Further, absorption by the residual vinyl group was observed in 1,640 cm$^{-1}$, and absorption of OH group was observed in 3,450 cm$^{-1}$ and that of

was observed in 1,730 cm$^{-1}$. From these facts, this compound was confirmed that it has a structure represented by formula (II) (wherein $R_1$: trimethylolpropane group, $n_1$, $n_2$, $n_3$: average 5, which slightly contained the group wherein acetic acid added to the epoxy group).

REFERENCE EXAMPLE

The whole amount of chlorine in the epoxy resins synthesized in Examples 4, 5 and 6 were measured.

Measurement was carried out by weighing about 2 g of the sample, which was subjected to decomposition and combustion by an oxygen cylinder to obtain results shown in Table 1. It is understood that the whole chlorine content in the resins of the present invention is very samll as compared with the conventional epoxy resins wherein the whole chlorine content was generally several hundreds ppm or so.

TABLE 1

| | Whole Chlorine Content in Epoxy Resin | | |
|---|---|---|---|
| | Epoxy Resin | | |
| | Product in Example 4 | Product in Example 5 | Product in Example 6 |
| Whole Chlorine Content (ppm) | 1.0 | 1.5 | 1.3 |

EXAMPLE 8

Gel time was measured by incorporating a hardener to the products in Examples 4, 5 and 6 to examine the curing property of epoxy resins. As the hardener, novolak type phenol resin (PSF-4300, Gun-ei Kagaku Kogyo Co.) was used. As a curing catalyst, 2-undecylimidazole (Curezol $C_{11}Z$, Shikoku Kasei Kogyo Co.) was used. As a comparative resin, 3,4-epoxycyclohexylmethyl-3',4'-epoxycyclohexanecarboxylate (Celloxide 2021, Daicel Chemical Industries, Ltd.) which was a typical alicyclic epoxy resin was used. Mixing was carried out using the following formulation. After blended by fusing at 120° C. for about 1 minute, the mixture was cooled to obtain a composition. Gel time of the resulting composition at 120° C. was measured according to JIS C2104-7 (hot plate method) to obtain results shown in Table 2. It is understood that the curing property of the resins of the present invention is higher than that of the prior alicyclic epoxy resin.

Formulation:
Epoxy resin: 1.0 equivalent weight
PSF-4300: 1.1 equivalent weight
Curezol $C_{11}Z$: 0.7% by weight (based on composition)

TABLE 2

| | Gel Time of Compositions | | | |
|---|---|---|---|---|
| | Epoxy Resin | | | |
| | Product in Example 4 | Product in Example 5 | Product in Example 6 | Celloxide 2021 |
| Gel Time | 12 minutes and 40 seconds | 9 minutes and 50 seconds | 20 minutes and 20 seconds | 23 minutes and 10 seconds |

EXAMPLE 9

Using the compounds in Examples 4, 5 and 6, properties of cured products were measured.

Using the same hardener and curing catalyst as in Example 8, the mixture having the following formulation was blended by the same manner as in Example 8 to obtain a composition. The resulting composition was powdered and a test sample was obtained by press molding. Molding was carried out under a pressure of 90 to 100 kgf/cm² with raising the temperature from 60° C. to 170° C. within about 30 minutes. After being allowed to stand under pressure at 170° C. for 10 minutes, post-curing was carried out in an oven kept at 180° C. for 2 hours. The resulting cured product was processed by machining operation to obtain a test sample. Properties of the product were measured according to JIS K-6911 to obtain results shown in Table 3.

Formulation:
Epoxy resin: 1.0 equivalent weight
PSF-4300: 0.9 equivalent weight
Curezol $C_{11}Z$: 0.7 part by weight (based on composition)

TABLE 3

| | Properties of Cured Resin | | |
|---|---|---|---|
| | Epoxy Resin | | |
| Property | Product in Example 4 | Product in Example 5 | Product in Example 6 |
| Water absorbing rate (%) | 0.22 | 0.26 | 0.21 |
| Heat distortion temperature(°C.) | 131 | 192 | 134 |
| Volume specific resistance (Mμ · cm) | $9.0 \times 10^9$ | $1.2 \times 10^{10}$ | $1.6 \times 10^{10}$ |

EXAMPLE 10

The product in Example 5 was cured using 4-methylhexahydrophthalic anhydride (Rikacid MH-700, Shinnippon Rika Co.) as a hardener. As a comparative resin, 3,4-epoxycyclohexylmethyl-3',4'-epoxycyclohexanecarboxylate (Celloxide 2021, Daicel Chemical Industries, Ltd.) which was a typical alicyclic epoxy resin was used, and mixing was carried out using the following formulation. After blended by fusing at 80° C. for about 5 minutes, the mixtures were defoamed under reduced pressure and cured in a mold to obtain cured products. Curing was carried out in an oven wherein precuring was carried out at 160° C. for 1 hour and post-curing was carried out at 180° C. for 2 hours.

The resulting cured products were processed by machining operation to produce test samples, and measurement of heat distortion temperature was carried out according to JIS K-6911 to obtain results shown in Table 4.

Formulation:
Epoxy resin: 1.0 equivalent weight
MH-700: 0.8 equivalent weight

TABLE 4

| | Heat Distortion Temperature | |
|---|---|---|
| | Epoxy Resin | |
| | Product in Example 4 | Celloxide 2021 |
| Heat distortion temperature | 216° C. | 200° C. |

EXAMPLE 11

Products in Examples 4 and 5 were cured using 4-methylhexahydrophthalic anhydride (Rikacid MH-700, Shinnippon Rika Co.) as a hardener and benzyldimethylamine as a curing catalyst. Further, as a comparative resin, 3,4-epoxycyclohexylmethyl,3,4-epoxycyclohexanecarboxylate (Celloxide 2021, Daicel Chemical Industries, Ltd.) which was a typical alicyclic epoxy resin was used, and mixing was carried out using the following formulation. After blended by fusing at 80° C. for about 5 minutes, the mixtures were defoamed under reduced pressure and cured in a mold to obtain cured products. Curing was carried out in an oven wherein precuring was carried out at 100° C. for 1 hour and post-curing was carried out at 160° C. for 2 hours.

The resulting cured products were processed by machining operation to produce test samples, and measurement of heat distortion temperature was carried out according to JIS K-6911 to obtain results shown in Table 5.

Formulation:
  Epoxy resin: 1.0 equivalent weight
  MH-700: 0.9 equivalent weight
  Benzyldimethylamine: 0.5% by weight (based on composition)

TABLE 5

| | Heat Distortion Temperature | | |
|---|---|---|---|
| | Epoxy Resin | | |
| | Product in Example 4 | Product in Example 5 | Celloxide 2021 |
| Heat distortion temperature | 185° C. | 156° C. | 180° C. |

EXAMPLE 12

32 g (1 mol) of methanol, 868 g (7 mols) of 4-vinylcyclohexene-1-oxide and 9.2 g of $BF_3$·etherate were mixed at 60° C., and they were allowed to react till the 4-vinylcyclohexene-1-oxide inversion rate measured by gas chromatography became 98.7% or more. The resulting crude reaction solution was washed with water by adding ethyl acetate, and the ethyl acetate layer was then concentrated to obtain a viscous liquid.

The resulting compound was confirmed that it has a structure represented by the following formula (I-7) from the facts that absorption of epoxy group in 810 and 850 cm$^{-1}$ being observed in the raw material disappeared in the infrared ray absorption spectrum of the product, that absorption by ether bond was present in 1,080 and 1,150 cm$^{-1}$ and that the product contained a trace amount of allyl alcohol in gas chromatography, but absorption of OH group was present in 3,450 cm$^{-1}$ in the infrared ray absorption spectrum.

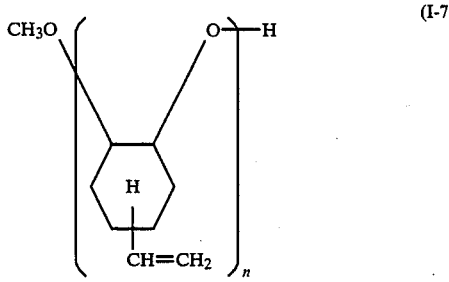

(I-7)

n: average 7

434 g of this compound was dissolved in ethyl acetate and put in a reactor. To the solution, a solution containing 388 g of peracetic acid in ethyl acetate was added dropwise over 2 hours. During the addition, the reaction temperature was kept at 40° C. After conclusion of addition of peracetic acid, the mixture was kept at 40° C. for 6 hours.

To the crude reaction solution, ethyl acetate was additionally added, and the solution was washed with an aqueous alkali solution containing 416 g of sodium carbonate and subsequently washed well with distilled water.

The ethyl acetate layer was concentrated to obtain a resin which was solid at room temperature. In this compound, the oxirane oxygen content was 9.97% and characteristic absorption by the epoxy group was observed in 1,260 cm$^{-1}$ in the infrared ray absorption spectrum. Further, absorption by residual vinyl group was observed in 1,640 cm$^{-1}$ and absorption by OH group and that by

were observed in 3,450 cm$^{-1}$ and 1,730 cm$^{-1}$, respectively. From these facts, this compound was confirmed that it has a structure represented by formula (II) (wherein $R_1$: methoxy group, n: average 7, which slightly contained the group wherein acetic acid added to the epoxy group).

EXAMPLE 13

The product in Example 12 was cured using 4-methylhexahydrophthalic anhydride (Rikacid MH-700, Shinnippon Rika Co.) as a hardener and benzyldimethylamine as a curing catalyst. Further, as comparative resins, 3,4-epoxycyclohexylmethyl-3',4'-epoxycyclohexanecarboxylate (Celloxide 2021, Daicel Chemical Industries, Ltd.) which was a typical alicyclic epoxy resin and bisphenol A diglycidyl ether (Epikote 828, Yuka Shell Epoxy Co.) which was a resin conventionally used were used. Mixing was carried out using the following formulation. After blended by fusing at 80° C. for about 5 minutes, the mixtures were defoamed under reduced pressure and cured in a mold to obtain cured products. They were subjected further to post-curing at 160° C. for 2 hours.

The resulting cured products were processed by machining operation to obtain test samples, and measurement of properties was carried out according to JIS K-6911 to obtain results shown in Table 6. As is clear from Table 6, the resin of the present invention has good heat resistance and excellent electric properties.

Formulation:
  Epoxy resin: 1 equivalent weight
  MH-700: 1 equivalent weight
  Benzyldimethylamine: 0.5% (based on composition)

TABLE 6

| | Properties of Cured Products | | |
|---|---|---|---|
| | Epoxy Resin | | |
| | Product of Example 12 | Celloxide 2021 | Epikote 828 |
| Heat distortion temperature (° C.) | 214 | 183 | 145 |
| Rockwell hardness (M scale) | 119 | 118 | 104 |
| Water absorbing rate | 0.28 | 0.28 | 0.18 |
| Volume specific resistance (Mμ · cm) | 3.5 × 10$^{10}$ | 5.3 × 10$^{8}$ | 10 × 10$^{10}$ |
| Arc resistance (second) | 124 | 135 | 22.7 |

EXAMPLE 14

The product in Example 12 was cured using 4-methylhexahydrophthalic anhydride (Rikacid MH-700, Shinnippon Rika Co.) as a hardener. Further, as comparative resins, Celloxide 2021 and Epikote 828 were used similarly to Example 13. Mixing was carried out according to the following formulation. After blended by fusing at 80° C. for about 5 minutes, the mixture were defoamed under reduced pressure and cured in a mold to obtain cured products. Precuring was carried out in an oven at 130° C. for 1 hour. Since Celloxide 2021 and Epikote 828 were still liquid in this stage, heating was continued at 130° C. for further 2 hours (a total of 3 hours). However, gelation was not caused, and thus heating was further continued at 140° C. for 1 hour. Consequently, gelation was caused. After the precuring was carried out under the above-described conditions, post-curing was carried out at 180° C. for 2 hours. However, a cured product was not obtained finally from Epikote 828.

The resulting cured products were processed by machining operation to obtain test samples and measurement of properties of them was carried out according to JIS K-6911 to obtain results shown in Table 7. As is obvious from Table 7, the resin of the present invention has good heat resistance and excellent electric properties.

Formulation:
Epoxy resin: 1 equivalent weight
MH-700: 0.8 equivalent weight

TABLE 7

| Properties of Cured Products | | |
|---|---|---|
| | Epoxy Resin | |
| | Product of Example 12 | Celloxide 2021 |
| Heat distortion temperature (°C.) | 192 | 188 |
| Rockwell hardness (M scale) | 117 | 117 |
| Water absorbing rate (%) | 0.28 | 0.31 |
| Volume specific resistance (Mμ · cm) | $3.8 \times 10^{10}$ | $3.2 \times 10^{10}$ |
| Arc resistance (second) | 123 | 149 |

EXAMPLE 15

Using the compound in Example 3 and a cresol-novolak epoxy resin (YDCN-702, a product of Tohto Kasei Co., Ltd.), properties of cured products were measured.

Using the same hardener and curing catalyst as in Example 8, the mixture having the following formulation was blended by the same manner as in Example 8 to obtain a composition. The resulting composition was powdered and a test sample was obtained by press molding. Molding was carried out under a pressure of 90 to 100 kgf/cm$^2$ with raising the temperature from 60° C. to 170° C. within about 30 minutes. After allowed to stand under pressure at 170° C. for 10 minutes, post-curing was carried out in an oven kept at 180° C. for 2 hours. Thr resulting cured product was processed by machining operation to obtain a test sample. Properties of it were measured according to JIS K-6911 to obtain results shown in Table 8.

Formulation:
Epoxy resin: 1.0 equivalent weight
PSF-4300: 1.0 equivalent weight
Curezol C$_{11}$Z: 0.7 part by weight

TABLE 8

| Properties of Cured Product | | |
|---|---|---|
| | Epoxy Resin | |
| Property | Product in Example 3 | YDCN-702 |
| Water absorbing rate (%) | 0.22 | 0.11 |
| Heat distortion temperature (°C.) | 211 | 180 |
| Volume specific resistance (Mμ · cm) | $3.5 \times 10^{10}$ | $4.7 \times 10^{10}$ |

While the invention has been described in detail and with reference to specific embodiments thereof, it will be apparent to one skilled in the art that various changes and modifications can be made therein without departing from the spirit and scope thereof.

What is claimed is:

1. A polyether compound having ether groups and vinyl double bonds represented by formula (I)

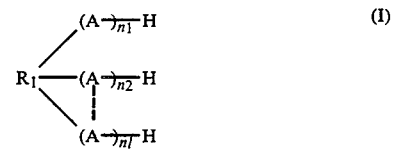

wherein R$_1$ represents a residue of an organic compound having l active hydrogen atoms, n$_1$ through n$_l$ each represents 0 or an integer of from 1 to 100, the sum of the integers represented by n$_1$ through n$_l$ is from 1 to 100, and l represents an integer of from 1 to 100, and A represents

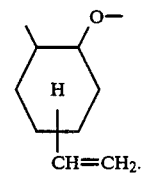

2. A polyether compound as in claim 1, wherein R$_1$ is the residue of an organic compound selected from the group consisting of an alcohol, a phenol, a carboxylic acid, an amine, and a thiol.

3. A polyether compound as in claim 2, wherein R$_1$ is the residue of an alcohol.

4. A process for producing a polyether compound having ether groups and vinyl double bonds represented by formula (I)

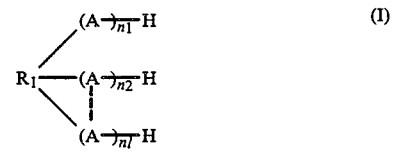

wherein R$_1$ represents a residue of an organic compound having l active hydrogen atoms, n$_1$ through n$_l$ each represents 0 or an integer of from 1 to 100, the sum of the integers represented by n$_1$ through n$_l$ is from 1 to 100, and l represents an integer of from 1 to 100, and A represents

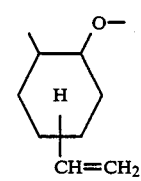

comprising reacting a compound having active hydrogen atoms with 4-vinylcyclohexene-1-oxide in the presence of a catalyst.

5. A process as in claim 4, wherein the compound having active hydrogen atoms is an alcohol, a phenol, a carboxylic acid, an amine, or a thiol.

6. A process as in claim 5, wherein the compound having active hydrogen atoms is an alcohol.

7. An epoxy resin represented by formula (II)

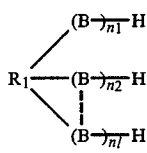
(II)

wherein $R_1$ represents a residue of an organic compound having l active hydrogen atoms, $n_1$ through $n_l$ each represents 0 or an integer of from 1 to 100, the sum of the integers represented by $n_1$ through $n_l$ is from 1 to 100, and l represents an integer of from 1 to 100, and B is an oxycyclohexane unit having a substituent and is represented by formula (III)

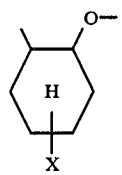
(III)

wherein X represents

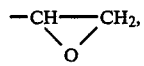

—CH=CH$_2$, or

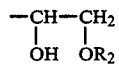

groups, wherein $R_2$ represents an alkyl group, an alkylcarbonyl group, or an arylcarbonyl group, provided that the epoxy resin represented by formula (II) contains at least one

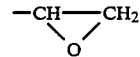

group.

8. An epoxy resin as in claim 7, wherein $R_1$ is the residue of an organic compound selected from the group consisting of an alcohol, a phenol, a carboxylic acid, an amine, and a thiol.

9. An epoxy resin as in claim 8, wherein $R_1$ is the residue of an alcohol.

10. A process for producing an epoxy resin represented by formula (II)

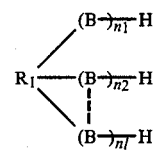
(II)

wherein $R_1$ represents a residue of an organic compound having l active hydrogen atoms, $n_1$ through $n_l$ each represents 0 or an integer of from 1 to 100, the sum of the integers represented by $n_1$ through $n_l$ is from 1 to 100, and l represents an integer of from 1 to 100, and B is an oxycyclohexane unit having a substituent and is represented by formula (III)

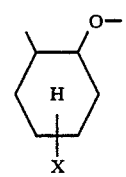
(III)

wherein X represents a

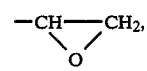

—CH=CH$_2$, or

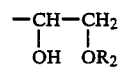

groups, wherein $R_2$ represents an alkyl group, an alkylcarbonyl group, or an arylcarbonyl group, provided that the epoxy resin represented by formula (II) contains at least one

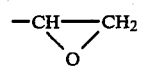

group,
comprising reacting a polyether compound represented by formula (I)

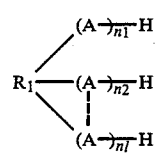
(I)

wherein $R_1$ and $n_1$ through $n_l$ are the same as defined above, and A represents

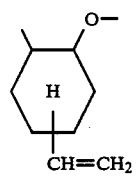

with an epoxidating agent.

11. A process as in claim 10, wherein $R_1$ is the residue of an organic compound selected from the group consisting of an alcohol, a phenol, a carboxylic acid, an amine, and a thiol.

12. A process as in claim 11, wherein $R_1$ is the residue of an alcohol.

13. An epoxy resin composition comprising a curing agent and an epoxy resin represented by formula (II)

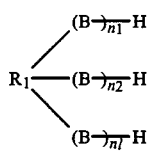
(II)

wherein $R_1$ represents a residue of an organic compound having $l$ active hydrogen atoms, $n_1$ through $n_l$ each represents 0 or an integer of from 1 to 100, the sum of the integers represented by $n_1$ through $n_l$ is from 1 to 100, and $l$ represents an integer of from 1 to 100, and B is an oxycyclohexane unit having a substituent and is represented by formula (III)

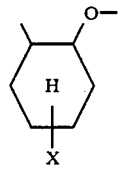
(III)

wherein X represents a

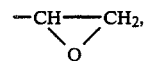

$-CH=CH_2$, or

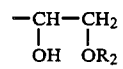

groups, wherein $R_2$ represents an alkyl group, an alkylcarbonyl group, or an arylcarbonyl group, provided that the epoxy resin represented by formula (II) contains at least one

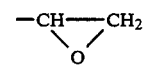

group.

14. An epoxy resin composition as in claim 13, wherein $R_1$ is the residue of an organic compound selected from the group consisting of an alcohol, a phenol, a carboxylic acid, an amine, and a thiol.

15. An epoxy resin composition as in claim 14, wherein $R_1$ is the residue of an alcohol.

* * * * *